Feb. 14, 1956   O. H. WALLINGFORD   2,734,538
FRUIT GRATING MACHINE HAVING A RESILIENTLY URGED CONCAVE
Filed Sept. 27, 1954   2 Sheets-Sheet 1

INVENTOR.
Otto H. Wallingford
BY Pike, Thompson and Sanborn
ATTORNEYS

United States Patent Office 2,734,538
Patented Feb. 14, 1956

2,734,538

FRUIT GRATING MACHINE HAVING A RESILIENTLY URGED CONCAVE

Otto H. Wallingford, Auburn, Maine

Application September 27, 1954, Serial No. 458,486

9 Claims. (Cl. 146—123)

The present invention relates to a machine for grating fruit and the like. The machine is particularly adapted for grating apples as a step in the production of fruit juice or cider, but it may be used equally well for grating other materials. It is described herein with particular reference to the grating of apples in order to illustrate the invention and its advantages.

To produce apple cider the apples are usually grated in order to be able to squeeze out the juice more easily. In the usual type of grating machine the apples are successively sliced to reduce them to small pieces. The apples are fed into a funnel-like throat which is formed by concave surfaces of concave elements adjacent a rotating cutter. Knives on the rotating cutter then continually slice the apples into smaller slices which work down through the throat until they are sliced small enough to drop through the bottom.

The concave elements, which are adjacent the cutter to form the throat, are usually pivotally mounted and urged to an adjusted position toward the cutter by springs. In this way the concave elements are yieldable and the pressure under which they are urged toward the cutter is adjusted so that a hard object, such as a stone, which may get mixed in with the apples, will pivot them away from the cutter until there is room for the object to pass through the throat without breaking the knives.

However, previous grating machines tend to contaminate the grated apples because the machines are unsanitary in operation and are usually contaminated. The previous machines are unsanitary in operation because juice thrown from the knives and splashing up from the sliced apples splashes over the mechanism which is provided to hold the concave elements resiliently in adjusted position. Some of this juice stays in the mechanism where it ferments or decomposes. The rest drips down over the mechanism and carries dirt, grease and decomposed fermented juice from previous operations into the grated apples.

The previous machines are usually contaminated because they are difficult to clean properly. For the machine to be properly cleaned all the surfaces of the cutter, of the concave elements and of the springs and other mechanism which become spattered with juice or pumice from the apples should be cleaned after each day's operation. To do this requires disassembling the entire machine, which has proved impractical with the previous machines. Therefore, in practice, the only attempt that is made to clean them is to sluice water or steam through the machine. This does not clean all the surfaces and the juice and pumice which is left on the uncleaned surfaces ferments or decomposes and contaminates the apples subsequently grated.

The amount of contamination of the grated apples shows up in the bacteria, yeast and mold counts of the cider or juice produced from them, and the true flavor, keeping quality and purity of the cider is impaired in proportion to the amount of bacteria, yeast and mold micro-organisms present.

Previous grating machines for grating fruit, and particularly apples, cause such high bacteria, yeast and mold counts that the rate at which the cider ferments is increased to a point at which preservatives must be added in order to keep the cider from turning to hard cider or vinegar before it reaches the ultimate consumer. Also, the bacteria count is frequently so high that the cider is dangerous to drink and must be pasteurized to comply with public health laws.

Pasteurization and the addition of preservatives further spoil the true flavor of the cider and also increases the cost. However, these disadvantages have been accepted when using the previous grating machines because the cost of trying to keep them clean and sanitary is much greater than the cost of pasteurization and preservatives. Also, with the previous grating machines, the effort and expense of trying to keep them clean is economically impractical.

It is an object of the present invention to provide a fruit grating machine which makes it possible to produce a purer product than produced from previous grating machines and at less cost than an inferior product is produced by the previous machines.

In the grating machine of the present invention, the concave elements are pivotally and yieldingly mounted, but the juice from the apples being sliced at the front or concave portion of the concave elements cannot spatter over the springs and other mechanism attached at the back of the concave elements. Likewise, grease and other contaminating material cannot pass from the mechanism at the back of the concaves into the grated apples. Therefore, the grating machine of the present invention remains sanitary during operation.

Furthermore, all the elements of the machine of the present invention are easily removed or exposed for thorough cleaning.

Only a few minutes are required after each day's operation to remove or expose all the elements, clean them thoroughly and then assemble them again. Thus, with the grater of the present invention it is commercially practical for the cider miller to produce a much better and purer product than now produced. In practice the grater of the present invention actually reduces the cost of producing cider because the bacteria count is reduced below the point at which pasteurization is necessary and is so low that the juice remains stable and reaches the ultimate consumer in fresh unfermented condition without addition of preservatives. In addition, by reducing the bacteria count and by eliminating the necessity for pasteurization and preservatives, the cider has a truer apple flavor and is thus commercially more attractive than the cider generally produced at present.

Further objects and advantages of the grater of the present invention will be apparent from the following description and accompanying drawings in which.

Figure 1:
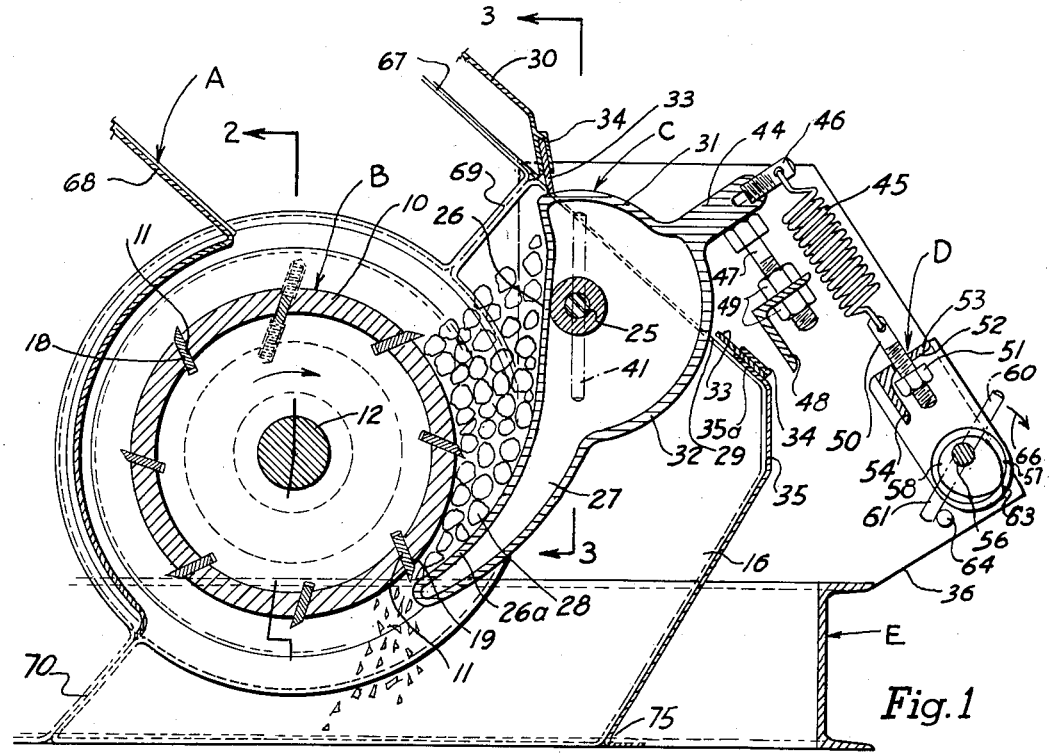
Fig. 1 is a vertical section through the machine in side elevation.

Referring now to the drawings, and particularly to Fig. 1, the grating machine of the present invention comprises generally a cylindrical cutter B mounted for rotation within the bottom portion of a hopper A, concave elements C pivotally mounted adjacent the cutter, partly inside and partly outside the hopper A, a tension device D to swing edges of the concave elements C toward the cutter B, and a base E, on which the whole is supported.

Figure 2:
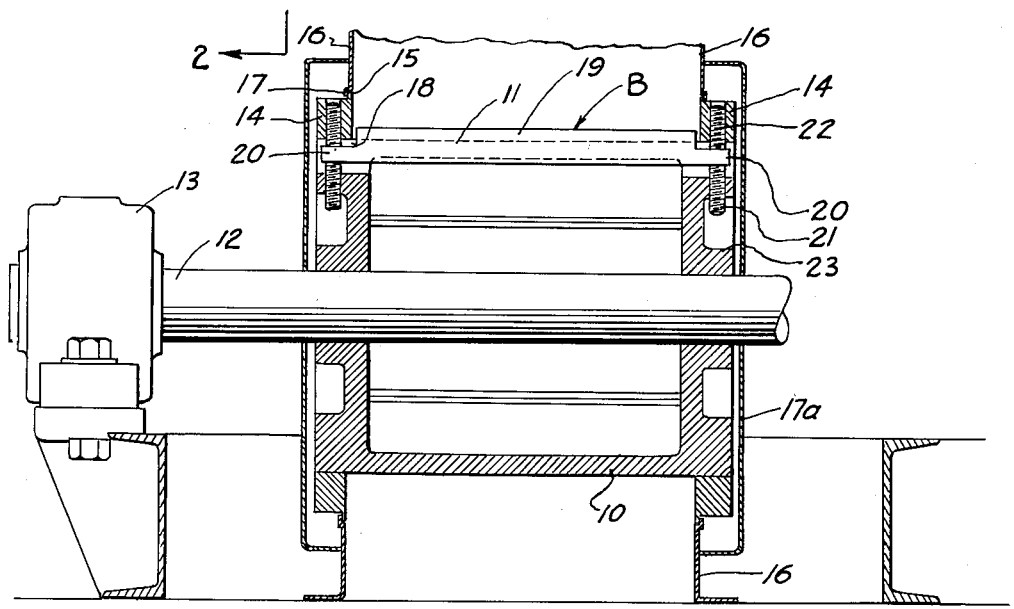
Fig. 2 is a vertical section through the cutter of the machine at the lines 2—2 of Fig. 1 looking in the direction of the arrows and showing part of the mounting for the cutter in elevation.

As illustrated in Figs. 1 and 2, the cylindrical cutter B is a cylinder 10 with knife blades 11 spaced around and projecting from its cylindrical surface. The cylinder 10 is keyed on a shaft 12 which is journalled in bearings 13 on the frame E and rotated in the direction of the arrow, by any conventional means (not shown). The ends of the cylinder 10 extend through holes in side walls 16 of the hopper A. A rim 14 around each end of the cylinder has a flange 15 at its inner edges and the edges of the holes in the side walls 16 are bent out and down as indicated at 17 (Fig. 2) to fit around the flanges 15 so that the inward sides of the rims 14 are flush with the side walls 16. Dust covers 17a are fitted over the exposed ends of the cylinder 10.

The knife blades 11 are received in slots 18 spaced around the cylindrical surface of the cylinder 10 and the slots 18 extend across the entire length of the cylindrical surface and under the rims 14 to the ends of the cylinders. The cutting edge 19 of each of the blades 11 extends between the inward sides of the rims 14 and ears 20 at the base of each blade extend outwardly in the slots 18 almost to the ends of the cylinder under the rims 14.

The cutting edges 19 of the blades are adjusted to project beyond the surface of the cylinder by screws 21 and 22. The screws 21 are threaded radially through the ends of the cylinder between wells 23 and the bottom of the slots 18 and engage the bottom of the ears 20 of the blades to support the blades in the slots and position the cutting edge 19 of the blade. The screws 22 threaded radially through the rims 14 engage the tops of the ears 20 and hold the blades 11 in adjusted position.

The height of each of the blades 11 is slightly less than the depth of the slots 18 so that the blades may be removed for sharpening or replacement by loosening the screws 21 and 22 and withdrawing the blade out from the side of the cylinder 10 under the rims 14.

Figure 3:
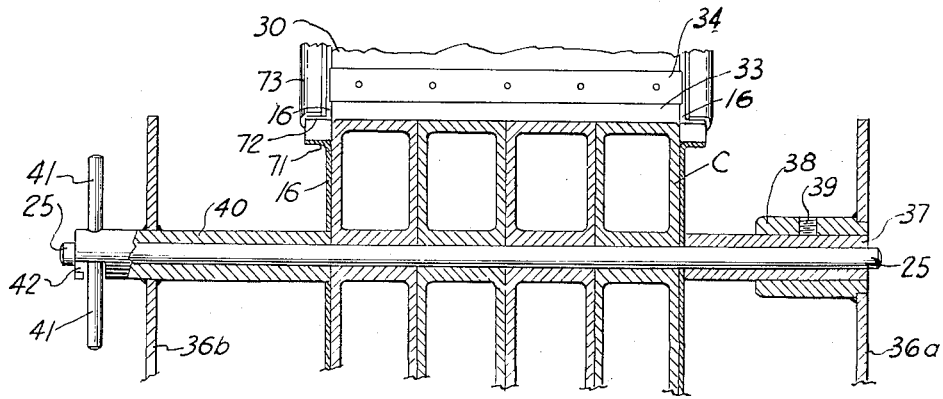
Fig. 3 is a vertical section through the concave elements of the machine at the lines 3—3 of Fig. 1 looking in the direction of the arrows and showing part of the mounting for the cutter partly in section and partly in elevation.
Figure 4:
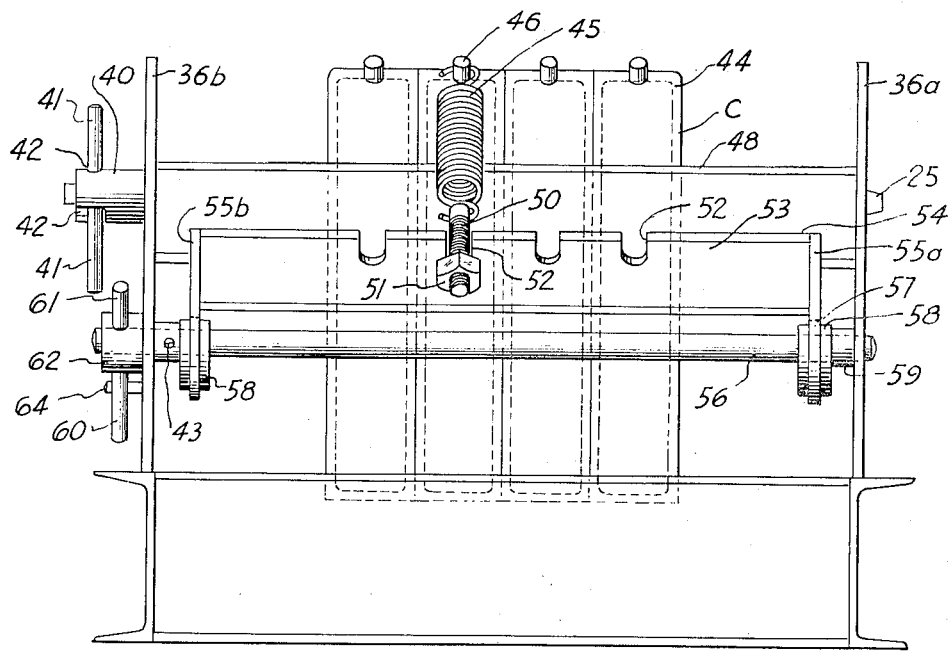
Fig. 4 is an end elevation of the machine viewed from the right-hand end of Fig. 1 and showing the tension device in relaxed position.

Referring now to Figs. 1, 3 and 4, several concave elements C are pivotally mounted side by side on a shaft 25, which is parallel to the axis of rotation of the cutter B. The concave elements C are adjacent the cutter B and have a concave edge 26 toward the cutter B. A nose-like projection 27 curves down from the bottom of each of the concave elements and the tension device D urges each of the concave elements to pivot so as to swing the concave edge 26a, which is the lower portion of the concave edge 26 on the projection 27, to an adjusted position toward the cutter B. In this adjusted position a throat is formed between the surfaces 26 of the concave elements C and the cutter B. The lower edges 26a are spaced from the cutter to leave a narrow opening at the bottom of the throat. Apples or fruit 28 put in the top of the hopper A drop into this throat and are successively sliced by the blades 11 until the slices are sufficiently small to drop through the narrow opening at the bottom.

As shown in Fig. 1, a portion of the top and back of each of the concave elements C extends through an opening 29 in the hopper A between the lower end of an upwardly slanted top wall 30 and the top of a rear wall 35 of the hopper. The surfaces 31 and 32 of the concave elements which are adjacent the upper and lower edges of the opening are arcuate and concentric with the shaft 25 about which the concave elements pivot. These surfaces 31 and 32 are made long enough so that a portion of their lengths will be adjacent the upper and lower edges of the opening 29, respectively, as the concave elements pivot during the operation of the machine.

Attached at the upper and lower edges of the opening 29 are resilient gaskets 33 which are in contact with the arcuate surfaces 31 and 32 and form a continuous seal with the arcuate surfaces 31 and 32 even when the concave elements C pivot. In this way, dirt, dust, flies or grease from outside the hopper, and particularly from the tension device D, cannot enter past the concave elements and the juice thrown from the cutter B or splashing up from the grated apples below cannot splash out of the hopper to the back of the concave elements.

The gaskets 33 may be made of rubber and may be held in place by caps 34 covering edges of the gaskets and attached to the top wall 30 and to the inwardly and upwardly directed top edge 35a of the rear wall 35.

As shown in Fig. 3, the outside edges of the several concave elements C, which are pivotally mounted on the shaft 25, are side by side but are not connected to each other. Thus each is free to pivot about the shaft 25 independently of those adjacent.

The shaft 25 is journalled in plates 36a and 36b which are upright from the base E. At one end (right-hand end in Fig. 3) the shaft 25 extends through a sleeve 37, which passes through a boss 38 on the plate 36a. The sleeve 37 is held in position through the boss 38 by a set screw 39 threaded through the boss. The other end of the shaft 25 extends through a sleeve 40 which is fixed through the plate 36b. The sleeves 37 and 40 thus hold the concave elements C in position at the central portion of the shaft 25.

The sleeve 40 extends outside the plate 36b, and handles 41 on the end of the shaft 25 engage bayonet slots 42 in the outward end of the sleeve 40 to hold the shaft 25 in place. The concave elements C are removed from the machine for cleaning or replacement by turning the shaft to disengage the handles 41 from the bayonet slots 42 and then withdrawing the shaft 25. The sleeve 37 is loosened within the boss 38 by loosening the screw 39 so as to slide the sleeve slightly away from the concave elements C. This provides sufficient clearance for the concave elements to be removed without binding between the sleeves 37 and 40.

Referring now to Figs. 1 and 4, a boss 44 projecting from the back of each of the concave elements C provides means by which the tension device D pivots each of the concave elements C so as to swing the edge 26 on the nose 27 to an adjusted position. In the tension device D a spring 45 is provided for each concave element and attached at one end to studs 46 which project from the bosses 44 of the concave elements. When the springs 45 are under tension the bosses 44 are drawn against stops 47 which are threaded through an angle iron 48. The angle iron 48 is attached between the plates 36a and 36b and the stops 47 are held in adjusted position by nuts 49.

The other ends of the springs 45 are attached to screw threaded pins 50, each of which has a nut 51 on it. The pins 50 are received in grooves 52 in the edge of a front panel 53 of a three-sided box 54, which provides an anchor for the spring and is moved back and forth by means to be described. The nuts 51 hold the pins 50 through the grooves so that rearward movement of the box 54 tensions the springs 45 and forward movement releases them. By this arrangement, the pins 50 are easily disengaged from the box 54 by lifting them out of the grooves 52, thereby disengaging one end of the springs 45, when the concave elements C are to be removed from the machine to be cleaned.

The box 54 comprises the front panel 53 between two side panels 55a and 55b, which are spaced slightly inside and parallel to the support plates 36a and 36b. A shaft 56 extends through the box 54 through holes 57 in the side panels 55a and 55b and is journalled in the support plates 36a and 36b. The holes 57 are considerably larger than the shaft 56 and cams 58 are attached on the shaft 56 within each of the holes 57. The cams 58 may be formed of segments of round shaft material mounted eccentrically on the shaft 56 and held in place by screws.

As shown, the cams 58 are rotated in the holes 57 to move the box 54 forward to relax the springs 45 and back to tension them by rotating the shaft 56, which rotates the cams 58 away from or against the back of the inside diameter of the holes 57.

Sleeves 59 on the shaft 56 between the cams 58 and the support plates 36a and 36b hold the shaft 56 and the cams 58 in proper position between the support plates. A set screw 43 is threaded through the sleeve 59, which is at the left of Fig. 3, and is tightened against the shaft 56 to secure the sleeve to the shaft and to hold the shaft between the support plates.

One end of the shaft 56, being the left end in Fig. 3, extends outside the plate 36b and is provided with a long handle 60 and a short handle 61 which project from opposite sides of the shaft. A sleeve 62 around the outward end of the shaft 56 serves as a stop to position the shaft through the support plates. The handles 60 and 61 are shown as passing out through the sleeve 62, which thus provides extra support for the handles which are subjected to stress when the tension device D is tensioned.

The box 54 of the tension device D is moved back to tension the springs 45 when the long handle 60 has been swung to the position shown in Fig. 1 so that the short handle 61 is against a stop 65.

Each of the cams 58 is arranged so that their largest diameters, indicated at 63 in Fig. 1, bear against the rear portion of the inside diameter of each of the holes 57 and at a point which is on the other side of the line of force created by the springs 45 from the stop 64. In this position the cams 58 are urged to rotate in a direction in which the short handle 61 is pressed against the stop 64. Thus the box 54 is locked in the tensioned position until the cams are rotated in the opposite direction by swinging the long handle 60 in the direction of the arrow 66 until the smaller diameters of the cams are at the rear of the holes, in which position the box 54 is free to move forward and release the tension on the springs 45.

After the machine has been used for grating apples, all surfaces inside the hopper A are spattered with apple juice and pumice and should be cleaned at least after each day's operation. Otherwise the juice and pumice will decompose and ferment and contaminate apples subsequently grated. The inside of the machine may be cleaned partially by flushing water or steam through the hopper, but the water or steam would not reach many internal surfaces and they would not be cleaned effectively. Therefore, to be completely cleaned, all the internal surfaces should be fully exposed so as to be thoroughly cleaned and inspected.

A hopper A is made in sections which fit around the cutter B and concave C and the sections are joined in a manner which permits them to be separated simply and quickly to expose all the internal surfaces of the grater.

The entrance through which apples to be grated are introduced into the hopper is at the top of the hopper and is formed by an open space between the upper ends of the side walls 16 and between the slanted upper end of a front wall 68 and the upper end of the top wall 30.

As shown at the left-hand side of Fig. 1, the front wall 68 of the hopper A is formed of a single piece of material, such as sheet metal, slanting down from the entrance at the top of the hopper and then curving out around the cutter B and dropping down to the base E of the machine. The side walls 16 are each broken in two parts joined together at a seam 69 extending from the top of the cutter B. Below the cutter B the side walls 16 join the front wall 68 at a seam 70 so that the side walls come apart from around the cutter. The top wall 30, which is bowed up, joins the side walls 16 at seams 67. The rear wall 35 is joined to the ends of the side walls 16 by seams, indicated at 75 in Fig. 1.

The seams 67, 69 and 70 are formed by bending the edges of the walls outward at right angles to form abutting flanges on adjacent walls, as illustrated in Fig. 3, by the flanges 71 and 72 on the side walls 16 and top wall 30, respectively. The rear wall 35 is a flat plate with its side edges secured across flanges on the rearward ends of the side walls 16. The seam 67 is held together by spring clips 73 which snap over the abutting flanges 71 and 72 so that the top wall 30 may be removed quickly and easily. The other seams may also be held by spring clips in the same manner. Of course the seams may be bolted, but the spring clips are removed more easily and quickly and yet hold them securely.

When the top wall 30 is removed the concave elements may be removed as previously described in order to separate them and expose their sides for cleaning. Then the inside of the hopper A and the cutter B may be cleaned thoroughly without having to remove the remaining walls since most of the inside surface area of the remaining walls is exposed. Part of the forward wall is hidden by the cutter but this wall may be cleaned effectively by flushing with water or steam since it is smooth with no cracks or projections which would trap juice or pumice. The surfaces of the cutter are successively exposed for cleaning by rotating it.

In the operation of the machine apples are placed in the top of the hopper A. The cutter B is rotated in the direction of the arrow and the knife blades 11 successively slice the apples which are in the throat between the cutter B and the concave elements C. When the slices at the bottom of the throat are small enough they drop through into a bin in the bottom of the hopper A.

If a stone or other hard object should enter the throat with the apples it works down toward the bottom of the throat with the sliced apples. When it gets down far enough for the surface of the cylinder 10 or the knife blades 11 to push it against the concave edge 26 of one of the concave elements C, the concave element yields against the tension of its associated spring 45 until the stone passes through and drops through the bottom of the throat. Some large slices of apple pass through the throat with the stone but only one, or possibly two, of the concave elements C are thus displaced and the grating action adjacent the other concave elements C is not disturbed.

As described above the machine of the present invention can be quickly and easily dismantled to clean thoroughly all the surfaces inside the hopper which are spattered with juice. Thus, it is practical to clean the machine thoroughly after each day's operation, so as to keep it in sanitary condition. Also as described above the gaskets 33 provide a tight seal around the concave elements C even as they pivot so that juice is kept inside the hopper and dirt is kept out. Thus, the material being grated is protected against contamination and a purer, more sanitary product is produced.

The above description is of a preferred embodiment of the machine of the present invention and certain variations and substitutions may be made in the structure of the machine without departing from the spirit of the present invention, the scope of which is set forth in the following claims.

I claim:

1. A machine for grating fruit and the like comprising in combination a hopper including side walls, end walls and a top wall, said hopper having an opening including opposite edges, at least one of said walls being adjacent said opening and detachably secured to adjacent walls, a rotating cutter within the hopper, a concave element pivotally mounted on a shaft with its axis parallel to the axis of the cutter, support members through which said shaft is removably journalled, a sleeve on one of said support members having a bayonet slot therein, said shaft passing through said sleeve and having a handle thereon to engage said bayonet slot and thereby secure said shaft through said support members, said concave element being mounted in position for a portion of it to be swung to a position adjacent the cutter, said concave element extending through said opening in the hopper and having arcuate surfaces which are concentric with its pivotal axis, said arcuate surfaces being adjacent opposite edges of said opening, resilient gaskets at said opposite edges of said opening and in contact with said arcuate surfaces, means outside the hopper for urging the concave element to pivot and swing said portion of the concave element toward the cutter, and stop means for limiting the swing of said portion toward the cutter.

2. A machine according to claim 1 in which the means for urging the concave element to pivot comprises a spring attached at one end to a portion of the concave element outside the hopper, a member having holes therethrough parallel to the axis of the concave element, means for detachably connecting the other end of said spring to said member, a shaft through the holes in said member and mounted for rotation parallel to the axis of the concave element, cams on said shaft and within said holes, means for rotating said shaft, and means operating when said shaft has been rotated to a predetermined position to hold it there.

3. A machine according to claim 1, in which adjacent edges of the walls of the hopper are outwardly turned and in abutting relation and in which the outwardly turned edges at opposite sides of one of the walls which is adjacent the opening in the hopper are detachably secured to the outwardly turned edges of adjacent walls by spring clips.

4. A machine for grating fruit and the like comprising in combination a hopper including side walls, end walls and a top wall, an end edge of the top wall being spaced from the top edge of one of the end walls to provide an opening in the hopper, means for detachably securing the top wall to the side walls, a rotating cutter within the hopper, a concave element pivotally mounted on a shaft with its axis parallel to the axis of the cutter, means for withdrawing said shaft from said concave element to dismount the concave element, said concave element being mounted in position for a portion of it to be swung to a position adjacent the cutter, said concave element extending through said opening in the hopper and having arcuate surfaces which are concentric with its axis, one of said arcuate surfaces being adjacent the said end edge of the top wall, another arcuate surface being adjacent the said top edge of the end wall, resilient gaskets on said edges of said opening, said gaskets being in contact with said arcuate surfaces, means outside the hopper and detachably connected to the concave element for urging the concave element to pivot and swing said portion of the concave element toward the cutter, and stop means for limiting the swing of said portion toward the cutter.

5. In a fruit grating machine and in combination, a hopper, a rotatable cutter within the hopper, a member pivotally mounted on an axis which is parallel to the axis of the cutter, said member having a downwardly depending concave element in proximity to the cutter and forming therewith a throat, said hopper having an opening including edges which are parallel to the axis of said member, said member having a part which extends out of the hopper through said opening, said part having arcuate surfaces which are concentric with the pivotal axis of the member, said arcuate surfaces being adjacent opposite edges of said opening and in slidable contact with said edges and being movable relative thereto to allow pivotal movement of the member while forming substantially liquid tight seals therewith, and tension means connected to said part of said member outside said hopper pivotally urging the said member in a direction to cause said concave element to approach the cutter and to confine the throat.

6. In the combination as set forth in claim 5, means associated with said member for detachably holding said member on its axis to permit removal of said member from said hopper.

7. In the combination as set forth in claim 5, said hopper being formed of removable sections and means separately to remove at least one of said hopper sections to provide access to the parts within the hopper.

8. In the combination as set forth in claim 5, said edges of said opening comprising rubber gaskets in contact with said arcuate surfaces.

9. In the combination as set forth in claim 5, said tension means comprising a spring and an anchor, said spring being attached at one end to said external part of said member and at its other end to said anchor and cam means supporting said anchor, said cam means being operable to move said anchor in one direction to provide tension in the spring and in the other direction to release said tension.

References Cited in the file of this patent

UNITED STATES PATENTS

| | | |
|---|---|---|
| 225,456 | Boomer et al. | Mar. 16, 1880 |
| 352,536 | Goodale | Nov. 16, 1886 |
| 699,219 | McDonald | May 6, 1902 |